United States Patent
Kahl

(10) Patent No.: US 10,043,380 B2
(45) Date of Patent: *Aug. 7, 2018

(54) SEGREGATION OF FUNCTIONALITY IN MONITORING AND CONTROL DEVICES

(71) Applicant: Edward Kahl, Portland, OR (US)

(72) Inventor: Edward Kahl, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/803,359

(22) Filed: Nov. 3, 2017

(65) Prior Publication Data

US 2018/0061224 A1    Mar. 1, 2018

Related U.S. Application Data

(63) Continuation of application No. 15/144,528, filed on May 2, 2016, now Pat. No. 9,812,003.

(60) Provisional application No. 62/156,230, filed on May 2, 2015.

(51) Int. Cl.
  *G08C 17/02* (2006.01)
  *H04Q 9/00* (2006.01)

(52) U.S. Cl.
  CPC ............. *G08C 17/02* (2013.01); *H04Q 9/00* (2013.01)

(58) Field of Classification Search
  CPC .......................... G08C 17/02; G08C 2201/93; G08C 2201/30; G08C 2201/20; G08C 2201/92; G08C 23/04; G08C 2201/32; G08C 2201/70

USPC ....................................................... 340/12.5
See application file for complete search history.

(56) References Cited

U.S. PATENT DOCUMENTS

| 7,733,224 | B2 | 6/2010 | Tran |
| 8,684,900 | B2 | 4/2014 | Tran |
| 9,520,250 | B2 | 12/2016 | O'Keeffe |
| 9,812,003 | B2 * | 11/2017 | Kahl ........................ H04Q 9/00 |

* cited by examiner

*Primary Examiner* — Mark Blouin
(74) *Attorney, Agent, or Firm* — Weide & Miller, Ltd.

(57) ABSTRACT

A fob device for integrating a one or more monitoring and control devices is provided. The fob device includes a plurality of input modules. The input modules are configured to connect with one of a plurality of monitoring or control devices. The plurality of monitoring and control devices are devices utilizing at least two distinct communication protocols. The fob also has at least one output module that may connect to a remote computing device, and an electronic control unit. The fob device may receive data from the monitoring and control devices communicatively coupled to the fob device and associate the received data with the monitoring or control device from which it was received. The fob outputs the received data that is associated with one of the communicatively coupled monitoring or control devices.

1 Claim, 3 Drawing Sheets

SEGREGATION OF FUNCTIONALITY IN MONITORING AND CONTROL DEVICES

CROSS REFERENCE TO RELATED APPLICATION

This application is a continuation of U.S. patent application Ser. No. 15/144,528, which was filed on May 2, 2016, which claims priority to U.S. Provisional Application No. 62/156,230, which was filed on May 2, 2015, the contents of which are hereby incorporated by reference.

BACKGROUND

New technology is rapidly changing the way we do things and the information that is available. Today's average consumer has affordable access to wearable devices that capture information, remote monitoring devices such as cameras or thermostats, and control devices that lock and unlock doors or open and close garage doors. One of the great issues is the lack of integration. A consumer might have to access several different devices and/or applications to get information or to control such things as a thermostat, garage door opener, digital video recorder, door lock, security camera, alarm system, or get information from their wearable devices. The present invention seeks to resolve this by creating an integrated system that centralizes the monitoring, reporting and control functions of monitoring and control devices.

SUMMARY

The disclosed embodiments have been developed in light of the above and aspects of the invention may include a fob device for integrating a one or more monitoring and control devices. The fob device includes a plurality of input modules. The input modules are configured to connect with one of a plurality of monitoring or control devices. The plurality of monitoring and control devices are devices utilizing at least two distinct communication protocols. The fob also has at least one output module that may connect to a remote computing device, and an electronic control unit. The fob device may receive data from the monitoring and control devices communicatively coupled to the fob device and associate the received data with the monitoring or control device from which it was received. The fob outputs the received data that is associated with one of the communicatively coupled monitoring or control devices In some embodiments, when the fob device connects with the communicatively coupled monitoring or control devices, the key fob captures and records information about the devices. The captured and recorded information may comprise device manufacturer, model number, and data format. The electronic control unit of the fob device may associate the received data by tagging the received data with captured and recorded information. Alternatively or additionally, the electronic control unit may modify the received data to include the captured and recorded information.

In further embodiments, there may be a monitoring and/or control device having segregated functionality. Such a device may include at least one first modular component configured to perform a first functionality. The first modular portion may have one or more input/output modules. There may further be at least one second modular component configured to perform a second functionality. The second modular portion may also have one or more input/output modules, and the at least one second modular component may be configured to be communicatively coupled to the at least one first modular component. The first functionality may be operable independent of the second functionality.

In some embodiments, the at least one first modular component is a fob device configured to be communicatively coupled to a plurality of the second modular component. The second modular component may be a wearable device. The wearable device may include a first modular subpart and at least one interchangeable second modular subpart. The first modular subpart may be communicatively coupled to the fob device, and the interchangeable second modular subpart may be communicatively coupled to the first modular subpart.

In still further embodiments, a method is provided for controlling and integrating a plurality of monitoring and control devices. The method may include providing a fob device that has a plurality of input modules. The input modules may each be configured to connect with one of the plurality of monitoring or control devices. The plurality of monitoring and control devices comprising devices utilize at least two distinct communication protocols. The fob has at least one output module configured to be communicatively coupled to a remote computing device, and an electronic control unit.

The method may further comprise receiving data at the fob device from one or more of the plurality of monitoring and control devices communicatively coupled to the fob device. The received data may be associated with one of the communicatively coupled monitoring or control devices from which it was received. The received data associated with the one of the communicatively coupled monitoring or control devices may then be output to the remote computing device.

In some embodiments, when the fob device connects with the communicatively coupled monitoring or control devices, the key fob captures and records information about the devices. The captured and recorded information may include device manufacturer, model number, and data format. The electronic control unit may associate the received data by tagging the received data with captured and recorded information or by modifying the received data to include the captured and recorded information.

In other embodiments, the method further comprises providing program instructions executable on at least one of the fob device or the remote computing device, and based on information received from a first device of the plurality of monitoring and control devices at the fob device, determining a command executable by a second device of the plurality of monitoring and control devices. The fob device may output the command to the second device. The plurality of monitoring and control devices may comprise a wearable device and/or an Internet of Things device.

Further objects, features, and advantages of the present invention over the prior art will become apparent from the detailed description of the drawings which follows, when considered with the attached figures.

DETAILED DESCRIPTION OF EMBODIMENTS

Figure 1:
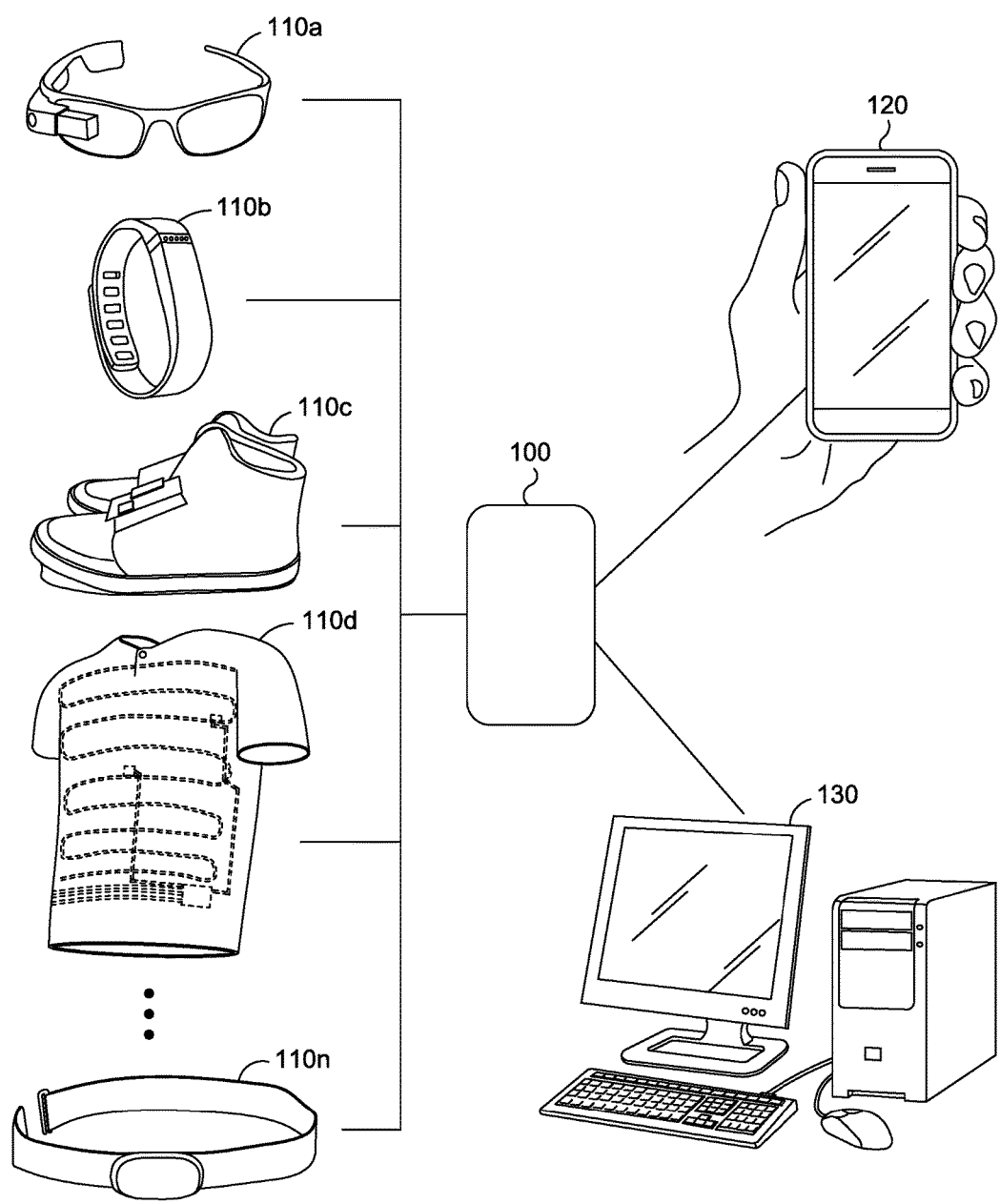
FIG. 1 is a schematic of a monitoring or control system, according to one exemplary embodiment.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Monitoring and control devices may include such things as garage door openers, thermostats, coffee makers, televisions, digital video recorders, satellite receivers, computers, cable receivers, cellular phones, light switches, sprinkler systems, refrigerators, washing machines, dryers, microwaves, security systems, surveillance cameras, dish washers and similar devices.

Wearable technology involves incorporating electronic or mechanical technology into items that are worn on the body. Such devices may be used to capture and transmit information including but not limited to such things as heart rate, blood pressure, movement, velocity, acceleration, physical location, air pressure, humidity, and other data.

Wearables may be incorporated into items like shoes, clothing, and other accessories that are worn on the body. Examples of wearables may include headbands, beanies, hats, shoes, shorts, pants, belts, shirts, jackets, wrist bands, vests, sweatshirts, ear muffs, scarves, socks, gloves, armbands, jewelry, sashes, sunglasses, suspenders, ties, coats, jackets, dresses, fanny packs, suits, T shirts, skirts, bathing suits, tank tops, slacks, jumpsuits, warm up suits, underwear, bra, pajamas, and robes.

In many instances, it may be desirable that the various features of such monitoring and control devices be combined to together provide a more fully functional monitoring and/or control device. In one embodiment, a detachable key fob device may be attached to monitoring and/or control devices. The key fob may act as a point of commonality among monitoring and control devices, which enables the centralization of the data storage, monitoring, reporting and control functions. The key fob may be configured to work with multiple appliances, wearables, and other devices from multiple manufacturers.

In one embodiment, the detachable key fob device may have duplicate functionality of some components of monitoring and control devices. In one embodiment, the data captured from each device is tagged with the manufacturer, model number, and other information by the key fob such that the data may be interpreted properly by a centralized software application.

In one embodiment, when the key fob device obtains information or data from one or more of the monitoring and/or control devices, the data is modified to include the manufacturer, model number, and other information such that the data may be interpreted correctly and that commands may be properly issued. In one embodiment, when the key fob device connects with the monitoring or control device, the key fob captures and records information about the device such as manufacturer, model number, data format, and other information to enable centralized monitoring and control.

In one embodiment, the attachment of additional information by tagging, modifying, or other means to data obtained from the monitoring or control device may occur when the key fob physically connects to the device, when the key fob wirelessly connects to the device, when the key fob obtains data from the device, when a centralized application obtains data from the device, when the key fob is physically disconnected from the device, when the key fob is electronically disconnected from the device, or any combination thereof.

In one embodiment, there may be a reusable key fob provided that is used with multiple monitoring and control devices from different manufacturers. In another embodiment, the key fob may also function as a security device. The key fob may contain or generate a security pass code, network identifier, and network information, other means to limit the potential for unauthorized access to monitoring and/or control devices. The system may also use a device's MAC address or IMEI number in combination with security codes and other information from the centralized software application and key fobs to help prevent unauthorized access.

In another embodiment, the functional components of a complete sensory, monitoring, or control device are separated such that some are contained in the key fob and others are in the actual device. By way of illustration, in some cases it may make sense to have the power and data transfer components contained in key fob that could be used with multiple monitoring and control devices from multiple manufacturers. The specific functionality of the removable device is variable and could include any combination of the individual functional components or any part thereof. By way of illustration, a complete monitoring or control device may include such functions as a processor, memory, data storage, wireless transmitter, power supply, sensory device, data port, motor, solenoid, etc. One or more functions may for one or more of the devices may be implemented on the key fob. There may also be a system in a physical location or group of locations in which there are multiple key fobs associated together as a group. In some embodiments, the key fob may act as a security identifier for the system.

In one embodiment, the method includes consolidating data from multiple monitoring and/or control devices made by different manufacturers into a single user interface that may be used on a phone, tablet, computer, or other electronic device. In this manner, the command and control functions from monitoring and/or control devices from different manufacturers may be consolidated into a single user interface that may be used on a phone, tablet, computer, or other electronic device.

In one embodiment, points of connection are embedded that allow data or commands to be transferred between the key fob, monitoring and/or control device, and the software application in which the key fob serves one or more functions of a complete monitoring or control device. In other words, the key fob may be configured to recognize a plurality of data formats or communications protocols to connect with the various monitoring and control devices.

Monitoring and control devices may include data ports that are embedded into the devices are at a specific place to physically connect to another device with a type of socket and plug. Examples of data ports are: universal serial bus (USB) ports, serial ports, parallel ports, expansion slots, firewire, IEEE 1394, Small Computer System Interface (SCSI) Ports, Ethernet Ports, PS/2 Ports, Audio Ports, Accelerated Graphics Port (AGP) slot, eSATA Ports, eSATAp Ports, Video Graphics Array (VGA) Connector, High-Definition Multimedia Interface (HDMI), Display Ports, Thunderbolt Ports, Standard A Ports, Standard B Ports, Musical Instrument Digital Interface (MIDI), Micro-USB Ports, and UPAMD P1823 Ports. In one embodiment, a single monitoring or control device may have multiple data ports for multiple devices. Further, the devices may utilize one or more wireless connections using known wireless protocols such as Bluetooth, NFC, WiFi, etc.

In one embodiment, the data port function of the device could be in a separate component that attaches and detaches from the device. In other words, the device may be configured to be modular By way of illustration, a shoe may be designed such that the heel (a modular subpart of the shoe) can be detached and reattached to the shoe. A data port may still reside in the shoe, or may be incorporated into the detachable heel component as well. By way of further illustration, a long sleeved shirt with detachable sleeves may incorporate the data port into the shirt, or the detachable sleeves, or both the shirt and the detachable sleeves.

One or more embodiments will now be described with reference to the drawings. FIG. 1 is a schematic of a monitoring or control system, according to one exemplary embodiment. In FIG. 1, a key fob 100 may be connected to a plurality of monitoring and/or control devices. In FIG. 1, wearable glasses 110a, a wrist band 110b, a smart shoe 110c, a smart shirt 110c, and a heart rate/health monitoring device 110n are shown to be in communication with the key fob 100. Any other number of devices may be connected to the key fob 100, such as a clip-on pedometer, an Internet of Things (IoT) device such as a lighting controller, a smart thermostat, etc. The devices 110a-110n may be wired or wirelessly connected to the fob 100, as described above.

The fob 100 is configured to receive data collected from the devices 110a-110n via the wired or wireless connection. The fob 100 is thus configured to communicate with different devices produced by various manufacturers. The fob 100 is also configured to send a data output to one or more of the devices 110a-110n.

The fob 100 may also be in communication with one or more computing devices, such as a smart phone 120, a personal computer 130, and any other computing device. The fob may forward data received from the various devices 110a-110n to the smart phone 120 and/or personal computer 130, and forward commands to the devices 110a-110n from the smart phone 120 and/or personal computer 130.

The fob 100 may be wired or wirelessly connected to the smart phone 120 and/or personal computer 130, similar to the manner described above. In other embodiments, the fob 100 may be in communication with a remote server via a wired or wireless network connection.

Figure 2:
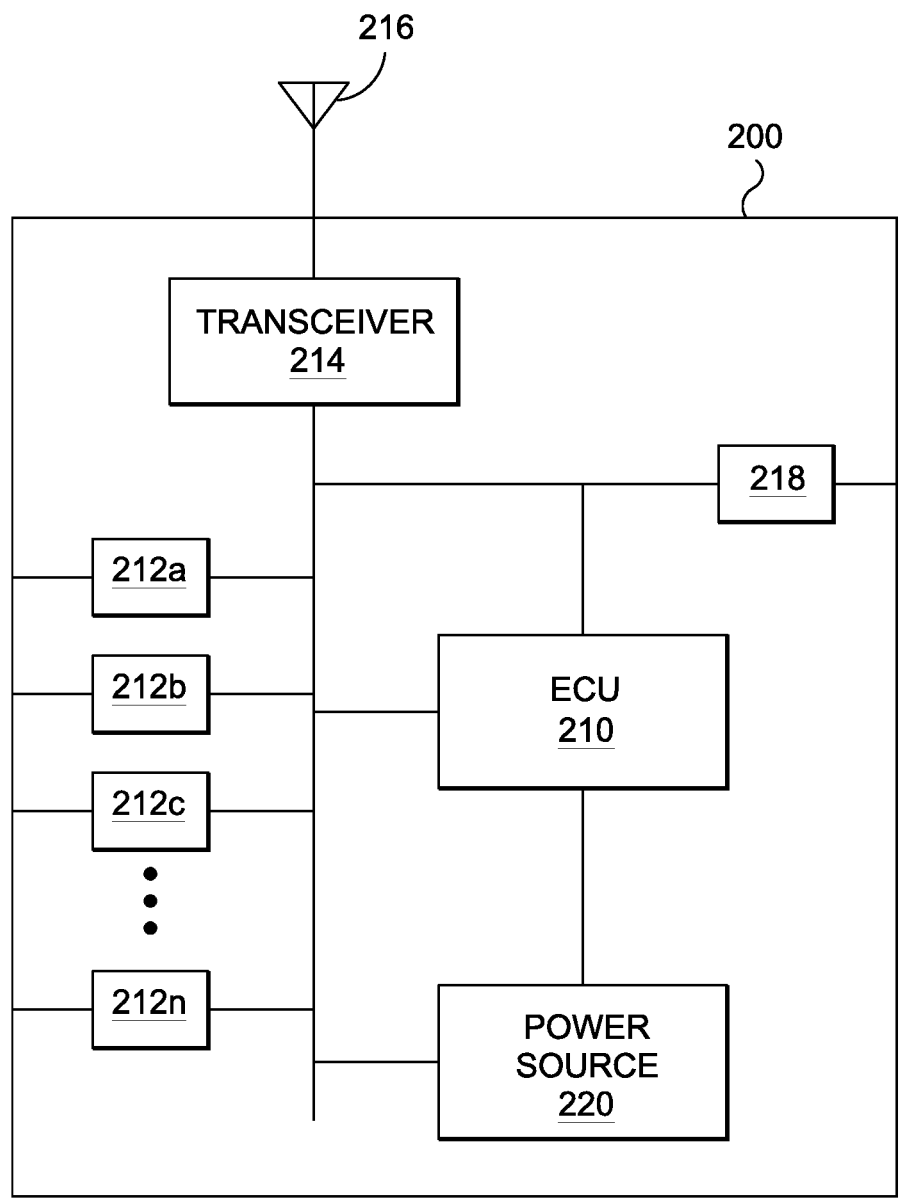
FIG. 2 is a schematic of an electronic FOB device for integrating functionality of a plurality of monitoring or control devices, according to one exemplary embodiment.

FIG. 2 is a schematic of an electronic FOB device for integrating functionality of a plurality of monitoring or control devices, according to one exemplary embodiment. In FIG. 2, the fob 200 comprises an electronic control unit ("ECU") 210. The ECU 210 may comprise a processor and memory storing machine readable instructions executable by the processor to drive the functionality of the fob 200.

The ECU 210 is connected to a power source 220. The power source 220 may include a battery and a power management device. The power source 220 may be connectable to an outside power source.

In one embodiment, the fob 200 further comprises a number of first input/output devices 212a-212n. The input/output devices may comprise one or more ports, such as the ports described above for connecting to one or more monitoring and/or control devices. Additionally, the fob 200 comprises one or more transceivers 214. The transceiver 214 has an antenna 216 for transmitting and receiving wireless signals. The transceiver 214 may connect to one or more external devices such as the monitoring and/or control devices, or a computer or smart phone device. The fob 200 may also comprise a second input/output device configured to connect to the smart phone or personal computer. The wired and wireless input/output devices 212a-212n, 214 may be considered input/output modules.

The fob 200 may be an exemplary fob for use as the fob 100 in the system shown in FIG. 1. The fob 200 may comprise one or more segregated functionality for one or more of the connected monitoring and/or control devices. As one example, the fob 200 may comprise a GPS or other location tracking device. The location detected by the fob 200 may be data that is combined with the data output from one or more of the connected monitoring and/or control devices.

In another embodiment, the fob 200 may facilitate additional functionality between the monitoring and control devices. That is, functionality or control of one of the devices may be dependent on a control or an input received from another one of the devices. For example, the fob 200 may be connected to a fitness tracking band that detects acceleration, motion, and/or heart rate of a user and may also be connected to a smart home device such as a thermostat. The fob 200 in connection with both devices may receive an input from the fitness tracker of a sustained increase in movement and/or heart rate. Based on the input, the fob 200 may send a command to the thermostat to decrease the temperature during the exercise of the user.

In some embodiments, the fob 200 may comprise one or more applications stored in the memory of the ECU 210. The applications facilitate control and feedback to and from the connected devices. The fob 200 may also include a display device and one or more input devices to interact with the fob 200. In another embodiment, the computing devices 120, 130 may comprise one or more applications to evaluate the data received from the fob 100, 200 and send control instructions to one or more of the connected devices to the fob 100, 200. By such applications, the user may be able to interact with all of the connected devices, including viewing data from the various devices and providing control instructions.

In some embodiments, a memory on the ECU 210 may be modified to add or replace "translators" for new devices. This allows the fob 200 to communicate with an ever changing array of devices which may be produced by different manufacturers and which may generate different types of outputs.

Figure 3:
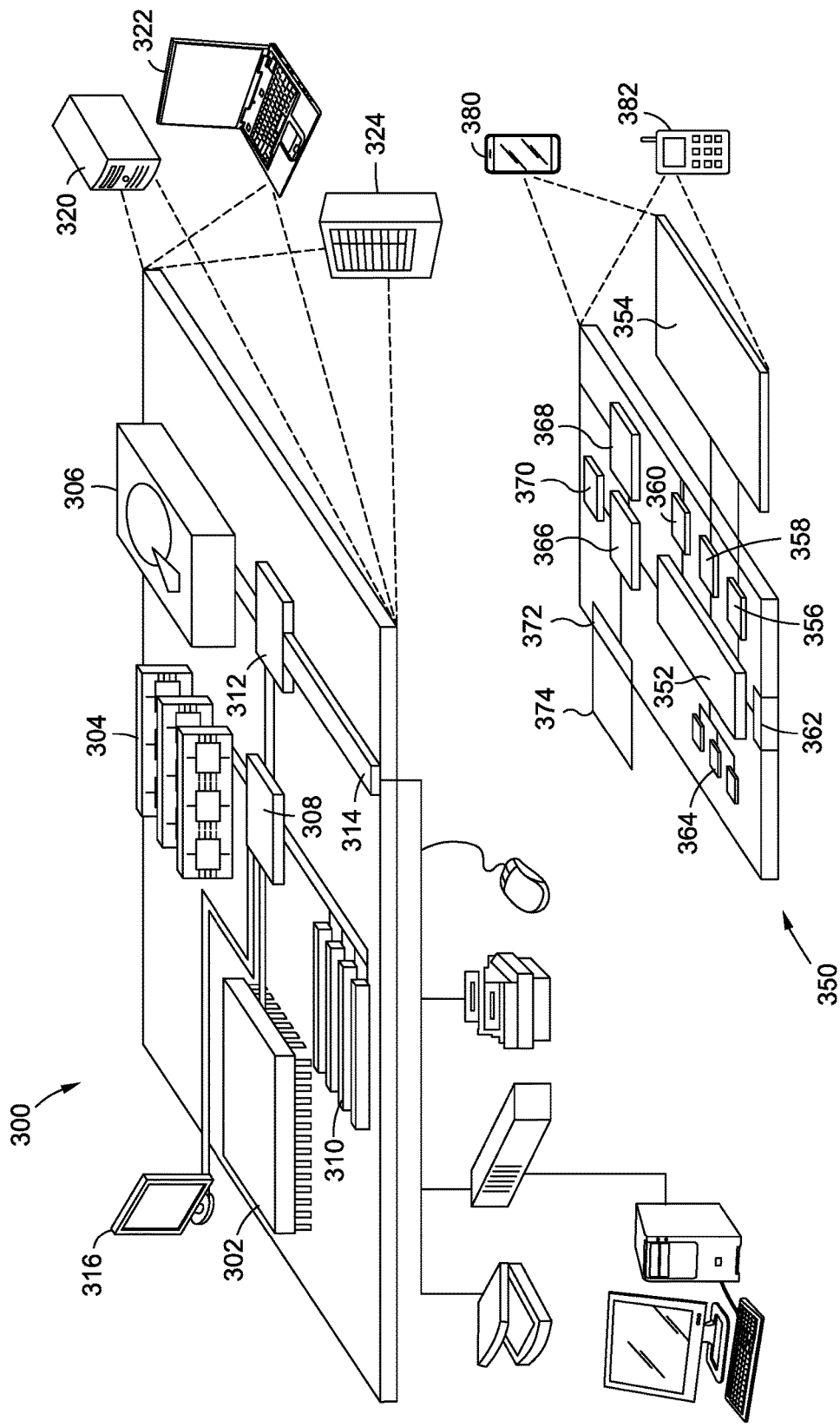
FIG. 3 is a schematic of a computing or mobile device for the monitoring and control system, according to one exemplary embodiment.

FIG. 3 is a schematic of a computing or mobile device for the monitoring and control system, according to one exemplary embodiment. FIG. 3 shows an example of a generic computing device 300 and a generic mobile computing device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface or controller 308 connecting to memory 304 and high-speed expansion ports 310, and a low-speed interface or controller 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed controller 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed bus 314. The low-speed bus 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, Wife, or other such transceiver (not shown). In addition, GPS (Global Positioning system) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 300 and/or 350) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 300 and 350 are configured to receive and/or retrieve electronic documents from various other computing devices connected to computing devices 300 and 350 through a communication network, and store these electronic documents within at least one of memory 304, storage device 306, and memory 364. Computing devices 300 and 350 are further configured to manage and organize these electronic documents within at least one of memory 304, storage device 306, and memory 364 using the techniques described herein.

The systems and methods in the present disclosure have a number of advantages. Consumers may be able to monitor all their physical data and also control appliances and audio visual devices from a single user interface. Moreover, consumers may not be required to download or install new software in all their electronic devices such as cell phones, tablets, desktop computers and laptop computers just because they bought a new shirt or changed an appliance or other device in their home.

The segregation of functionality results in unique advantages. By limiting the functionality contained in the sensory or control device, the cost of the additional functionality is reduced for the device. Additional cost savings are realized by having a several key fobs that can be connected to many different monitoring or control devices from different manufacturers.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A fob device for integrating a one or more monitoring and control devices, the fob device comprising:
    a plurality of input modules, the input modules each being configured to connect with one of a plurality of monitoring or control devices, the plurality of monitoring and control devices comprising devices utilizing at least two distinct communication protocols;
    at least one output module configured to be communicatively coupled to a remote computing device; and
    an electronic control unit configured to receive data from monitoring and control devices communicatively coupled to the fob device, associate the received data with one of the communicatively coupled monitoring or control devices, and output the received data associated with the one of the communicatively coupled monitoring or control devices.

* * * * *